United States Patent [19]

Layne

[11] 4,213,279
[45] Jul. 22, 1980

[54] DOCK SEAL FOR BUILDING DOORWAY

[76] Inventor: Richard C. Layne, 155 Superior St., Marion, Ohio 43302

[21] Appl. No.: 932,205

[22] Filed: Aug. 9, 1978

[51] Int. Cl.² .......................... E06B 7/23; E06B 9/00
[52] U.S. Cl. ............................................... 52/173 DS
[58] Field of Search ...................... 52/173, 173 DS, 2

[56] References Cited
U.S. PATENT DOCUMENTS

| | | | |
|---|---|---|---|
| 2,122,608 | 7/1938 | Harlow | 49/496 |
| 3,286,417 | 11/1966 | Dazzo | 52/173 DS |
| 3,375,625 | 4/1968 | Edkins et al. | 52/173 DS |
| 3,500,599 | 3/1970 | Sciolino | 52/173 DS |
| 3,528,086 | 9/1970 | Conger | 52/173 DS |
| 3,665,997 | 5/1972 | Smith et al. | 52/175 DS |
| 3,683,572 | 8/1972 | Altin | 52/173 DS |
| 3,772,839 | 11/1973 | Timbers | 52/173 DS |
| 3,896,517 | 7/1975 | Bigelow, Jr. | 52/173 DS |

*Primary Examiner*—Alfred C. Perham
*Attorney, Agent, or Firm*—Frank H. Foster

[57] ABSTRACT

A dock seal for use around a building doorway against which any of various style trucks can back to create a totally-sealed, safe, dry passageway. It includes several sections around the building doorway each having a sealing body of resiliently flexible and compressible foam material of L-shaped cross-section enclosed in a thin flexible cover. The sections are so arranged that as the truck backs into cooperation with the doorway, a part of its rear edge engages the flexible flange of each seal section so that an effective seal will be created around the truck. This also creates a totally safe dry passageway for loading or unloading. The seal body cover is provided with ventilating means to facilitate compression, bending and expansion of the body and stiffening means where needed. Means is also provided for mounting the seal body for ready removal and replacement.

10 Claims, 6 Drawing Figures

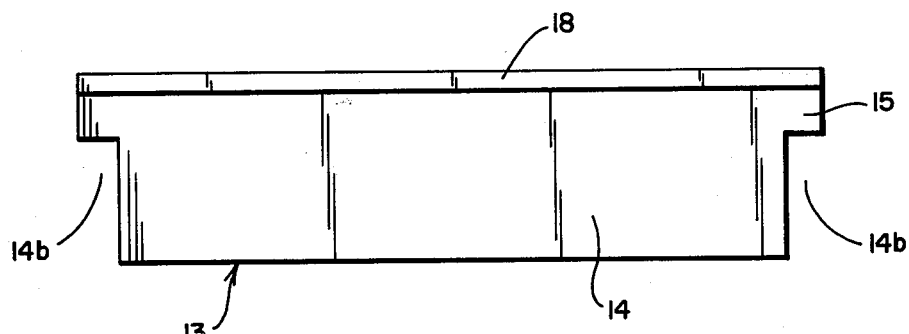
FIG. 4
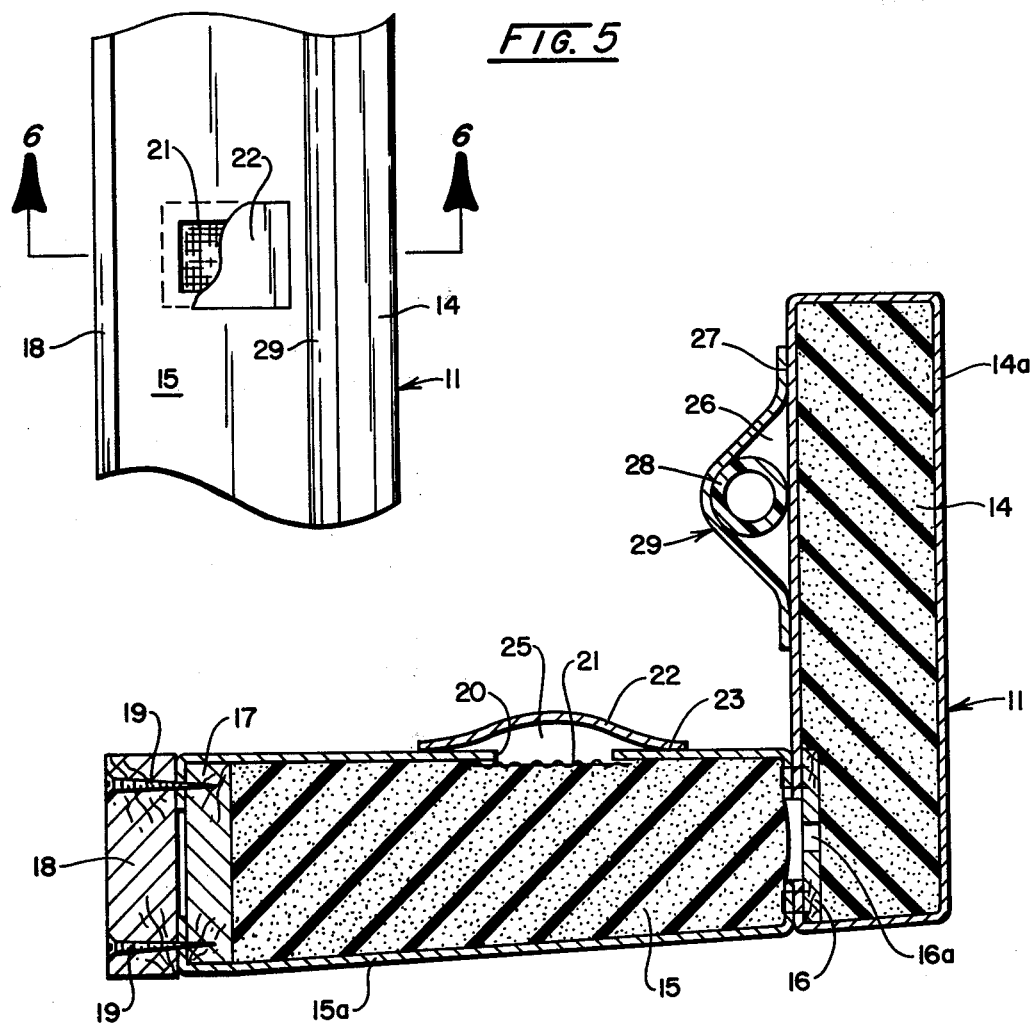
FIG. 5
FIG. 6

DOCK SEAL FOR BUILDING DOORWAY

BACKGROUND OF THE INVENTION

As is well known, trucks or trailers of the van type, with open rear doorways, are backed into cooperation with building doorways for loading and unloading. The width of the truck bodies is usually the same standard width as that of the building doorways. It is desirable to seal out the weather, when loading and unloading, and dock seals commonly in use are of the type embodying a compressible body of square or rectangular cross-section. To insure that the rear edges of the trucks engage these compressible bodies, they must be so disposed that they overlap or extend into the doorway. This, reduces the size of the passageway between the building and the truck. Also, air and water usually becomes entrapped within the cover on the compressible body of this type of seal, and interferes with compression and expansion. Furthermore, it is usually difficult to remove and replace these compressible seals.

SUMMARY OF THE INVENTION

The present invention provides a dock seal which comprises sections mounted at the edges of the building doorway. Each section includes a body of resiliently, flexible, compressible material, usually plastic foam, enclosed within a flexible cover, usually plastic sheet. Each section of the body is of L-shape cross-section and is removably mounted at the edge of the doorway but outside the opening. This is accomplished by having the inner edge of one of its flanges secured to the building wall or door frame adjacent the opening and its other flange disposed outwardly and extending into overlapping relationship with the opening. Consequently, when the truck backs up to the doorway, this latter flange of each section will engage and hug it. This inwardly extending flange will be bent laterally by the truck so it will usually not take away substantially from the extent of the doorway. A flexable waterproof cover will cover the body of each seal section, but this cover will be provided with ventilating passageways for the flow of air during flexing or compression and expansion of the body. Also, to keep the sections from sagging reinforcing means will be provided which extends along each section.

BRIEF DESCRIPTION OF THE DRAWINGS

The best mode contemplated in carrying out this invention is illustrated in the accompanying drawings in which:

FIG. 4 is a front elevational view of the top section of the seal;

FIG. 5 is a fragmentary inner elevational view of the body of one of the sections of the seal; and FIG. 6 is an enlarged horizontal sectional view taken along line 6—6 of FIG. 5.

DETAILED DESCRIPTION OF THE INVENTION

Figure 1:
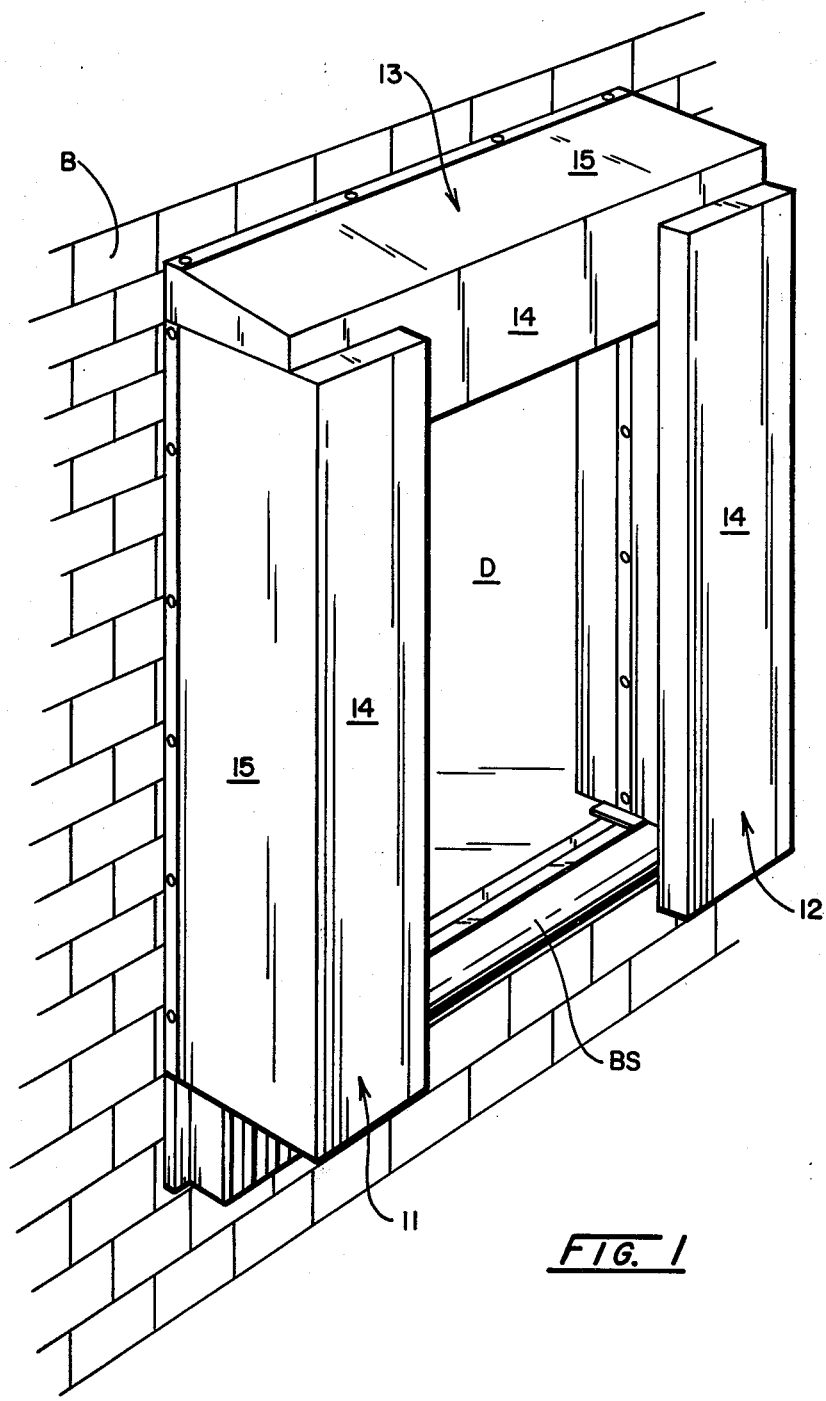
FIG. 1 is a perspective view of a dock seal embodying this invention, mounted on the exterior of a building in cooperation with a doorway.

With specific reference to the drawings and particularly to FIG. 1, there is shown a building B having a doorway D. Around the doorway is the dock seal of this invention which is shown as comprising vertical sections 11 and 12, disposed at opposite sides of the doorway, and a horizontal header section 13 disposed at the upper edge of the doorway disposed at the upper edge of the doorway and bridging the space between the sections 11 and 12 at their upper ends. A suitable bumper seal BS may be located at the lower ends of sections 11 and 12.

Figure 3:
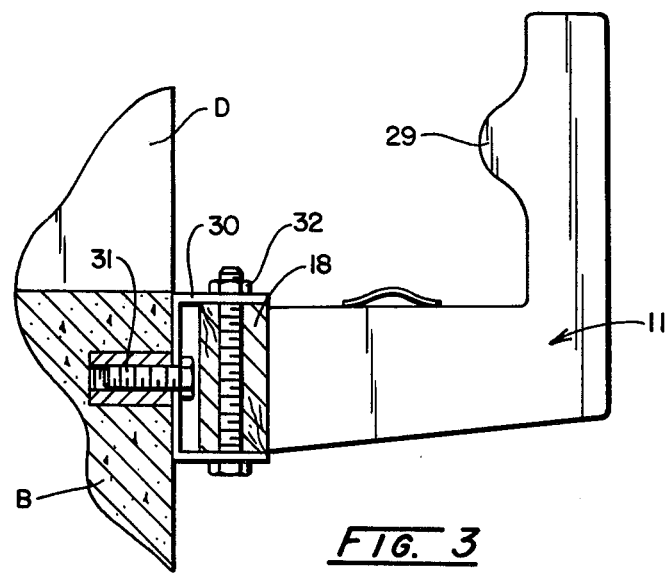
FIG. 3 is a view of the end of a seal body section showing, in section, how it is mounted at the doorway.

Each of the sections 11, 12 and 13 has a body which is L-shaped in cross-section and is of the overall structure illustrated in FIGS. 3 and 6. The L-shaped body is provided by two flange-forming strips 14 and 15 which are of resiliently flexible and compressible material, for example, polyurethane foam. The strip 14 is adapted to form the outer flange and the strip 15 is adapted to form the inner flange and the two strips are secured together preferably in right angular relationship. Where they are secured together, a reinforcing flat strip 16 of wood or semi-rigid plastic material may be provided which is suitably secured, for example by adhesive, to both flange body strips.

The inner edge of the flange strip 15 is fastened, by adhesive or other suitable means, to a rigid strip 17 of wood or plastic. The two flange bodies 14 and 15 are covered with suitable flexible waterproof film or sheet, for example, high-abrasion, resilient vinyl-coated nylon cloth. Thus, the flange-forming body strip 14 is covered with the cover 14a which extends completely around all its side surfaces and ends and its free edges overlap the edges of the reinforcing strip 16 and are fastened thereto, such as by staples. Similarly, the flange-forming body strip 15 is covered by the cover 15a, which is formed in two pieces one of which covers the inner side surface or face and the other the outer side surface or face. The outer edge of each is tucked between the outer edge of the member 15 and the adjacent edges of the cover 14a and the inner edge of each is turned over the inner face of the rigid strip 17 and may be adhered thereto. Secured flat to the face of the strip 17 is a rigid relatively thick mounting strip 18, which may be nailed thereto by nails 19 or otherwise secured in flat contact therewith over the turned edges of the cover 15a. All cover edges are tucked in to prevent water penetration.

To permit flow of air to and from the strip 15, as it is compressed or flexed, the inner part of cover 15a is provided with a ventilating hole 20 which may be covered with a screen 21. Several of these holes may be provided at longitudinally spaced intervals if desired. To prevent rain from driving through each ventilating hole, it is covered with non-perforated tab 22, of the cover material, which is bowed over the opening into substantially tubular form to provide a passageway 25 opened at two ends. This tab may be adhered to the outer surface of the cover part at the opposed seams 23. Thus, the space within cover 15a will be ventilated at vent opening or openings 20. So that the space within cover 14a is also vented, the reinforcing strip 16 may be provided with vent holes 16a at longitudinally spaced intervals.

To further reinforce the flange-forming strip 14 on its inner surface, a pocket 26 may be provided intermediate its lateral extent by means of a strip of cover material which is adhered to the surface at the opposed seams 27 and is bowed transversely to form the pocket, for substantially the length of the member 14. Within this pocket, is disposed a reinforcing tube 28 of semi-rigid resilient plastic material which will bend, but not as easily as the foam plastic of the strip member 14. This pocket is closed at its ends, as indicated at 29 in FIG. 3. Reinforcing tube 28 will normally reinforce lateral flanges 14, especially the vertical ones, to prevent waves or bends therein, because of the flexibility of the body material. It will be noted from this Figure and FIG. 6, that the outer projecting face of the outwardly projecting flange 15 of each of the sections 11, 12 and 13 tapers laterally inwardly towards its outer edge.

With this L-shaped assembly formed as indicated, it is a simple matter to removably mount it on the building B at the doorway D. To do this vertical channels 30 are provided and may be bolted to the face of the building at each side and top of the doorway, by bolt units 31, or be secured thereto in other ways. Then, it is merely necessary to slip the base or mounting strips 18 of the respective sections 11, 12 and 13 into the respective channels 30, and secure them therein by means of bolts 32 which are passed through the channel flanges and transversely through the strips. Obviously, the seal sections 11, 12 and 13 can be easily removed for replacement by removal of the bolts 32. The channels serve to provide a waterseal at the mounting edges of the sections, that is, at strips 18.

The section 13 which forms the header will be shaped slightly differently from the side sections 11 and 12 and be of slightly different cross-sectional size so as not to interfere with the upper ends thereof. Thus, as shown in FIG. 4, it will be necessary to provide notches 14b at each end in the laterally or downwardly projecting flange 14. Obviously, the header section 13 will be mounted with its flange 14 projecting down over the doorway and the notches 14b will extend up to the outwardly projecting flange 15 thereof. These notches will receive the upper ends of the flanges 15 of the respective sections 11 and 12, whereas the upper ends of the lateral flanges 14 thereof will overlap the depending flange 14 of the section 13. It will be apparent that the flange 15 of each vertical section 11 and 12 will be greater in depth than the corresponding flange 15 of the horizontal header section 13 to an extent equal to the thickness of each of the flanges 14 of the sections 11 and 12.

Figure 2:
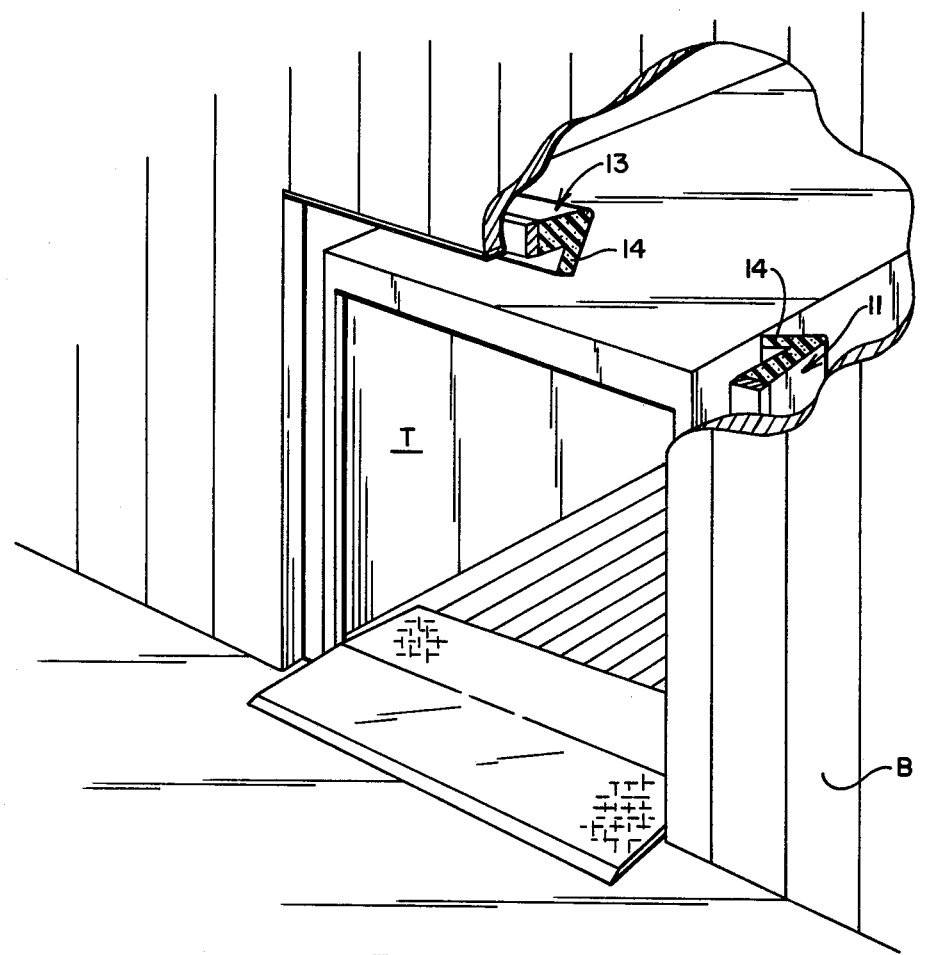
FIG. 2 is a perspective view, partly cut away, from the interior of the building, showing the rear edge of a van-type truck body engaging the seal.

The sections are mounted around the doorway D as indicated in FIG. 1 so that the flanges 14 thereof will project laterally into or overlap the opening. It will be noted that a seal is thus provided at the sides of jambs of the doorway and the top of header of the doorway. The header section 13 will have an outwardly inclined upper surface to shed rain. A van type truck or trailer T can back into this seal arrangement so that its rear edges will engage the seal to provide a sealed passage at the sides and top of the doorway in the manner illustrated in FIG. 2. The outer laterally projecting flanges 14, of the respective seal sections, will be engaged by the rear edges of the truck body and will be flexed or bent inwardly and laterally outwardly and will eventually hug the respective sides and roof of the truck body, as indicated. The outwardly projecting flanges 15 may also flex at this time. As soon as the truck pulls away, the bent flanges will return to their original positions.

With the dock seal described arranged at the door as, indicated, there will be little or no interference with the door opening so that substantially its entire area will be useful in loading and unloading. Because of the way the seal hugs the trucks, it will accomodate trucks in sloped driveways, step trucks, and different style trucks. The interior of each seal body will be ventilated, facilitating flexing or compressing even though the members are enclosed in waterproof covers. A simple effective arrangement is provided for removably mounting the sections for ease in replacement.

Having thus described this invention what is claimed is:

1. A dock seal for use around a door opening having substantially vertical jambs and a horizontal header, said seal comprising a resiliently flexible and compressible seal member of L-shape form, having attaching means at one of its edges for attaching the seal member at a jamb to support the seal with an inner flange extending forwardly outwardly from the jamb and with a laterally extending outer flange which is adapted to project over the opening so as to be engaged by a backing vehicle to be loaded or unloaded through the door opening, said inner flange extending sufficiently outwardly from the jamb to position said outer flange sufficiently away from the jamb to permit a vehicle to be backed against the jamb and bend the laterally projecting flange rearwardly and outwardly away from the vehicle opening to wipe against and hug the side of the vehicle.

2. A dock seal according to claim 1 in which the seal member includes a body of plastic foam material and a covering of sheet plastic.

3. A dock seal according to claim 2 in which the cover on the inner flange is provided with ventilating openings which function if the foam material thereof is compressed.

4. A dock seal according to claim 3 in which the outer flange of the body is provided with reinforcing strips extending along its length intermediate its lateral extent.

5. A dock seal according to claim 1 comprising a plurality of sections of said L-shaped members, one of said sections being vertically mounted along each of the jambs of the door opening and another section being horizontally mounted at the header of the opening in cooperation with the upper ends of the vertical sections.

6. A dock seal according to claim 5 in which the horizontal header section has its outer flange in depending vertical relationship to the opening, notches being provided at the ends thereof to receive the upper ends of the outwardly projecting flanges of the vertically mounted sections so that all of said depending and projecting flanges can flex to wipe against and hug the vehicle.

7. A dock seal according to claim 4 in which each L-shaped seal member comprises separate flange-forming body sections joined together substantially at right angles at a suitable joint to provide the forwardly outwardly extending and laterally extending flanges, one of said reinforcing strips being a reinforcing strip of relatively rigid form provided at said joint and extending longitudinally of the flange-forming sections.

8. A dock seal according to claim 7 including a weatherproof cover for each section, and means at said outwardly extending flange for ventilating the cover.

9. A dock seal according to claim 8 including a reinforcing tube of semi-rigid plastic in a pocket in the cover on the face of the laterally extending flange-forming section and intermediate its lateral extent.

10. A dock seal according to claim 9 in which said forwardly outwardly extending flange forming section is secured to a mounting strip at its inner rear edge, a channel secured adjacent the door opening in which said strip is inserted, and means for securing the strip in the channel.

* * * * *